United States Patent
Jan

(10) Patent No.: US 7,567,295 B2
(45) Date of Patent: Jul. 28, 2009

(54) VIDEO SYSTEM AND PROCESSOR FOR COMPUTER

(75) Inventor: Shang-Yi Jan, Taipei (TW)

(73) Assignee: Aopen Incorporated, Taipei (TW)

( * ) Notice: Subject to any disclaimer, the term of this patent is extended or adjusted under 35 U.S.C. 154(b) by 757 days.

(21) Appl. No.: 11/242,781

(22) Filed: Oct. 5, 2005

(65) Prior Publication Data

US 2006/0132476 A1 Jun. 22, 2006

(30) Foreign Application Priority Data

Dec. 17, 2004 (TW) .............................. 93139498 A

(51) Int. Cl.
*H04N 7/00* (2006.01)
*H04N 3/27* (2006.01)
(52) U.S. Cl. ....................... 348/552; 348/554
(58) Field of Classification Search ......... 348/552–554; 725/141, 133, 153; 345/87, 204; 710/14, 710/305, 260; 713/1, 2, 300, 324; *H04N 7/00, H04N 11/00, 5/44, 3/27*
See application file for complete search history.

(56) References Cited

U.S. PATENT DOCUMENTS 7,260,318 B2 * 8/2007 Wang et al. ................. 386/126
2004/0257320 A1 * 12/2004 Wang et al. ................... 345/87

* cited by examiner

*Primary Examiner*—Sherrie Hsia
(74) *Attorney, Agent, or Firm*—Stout, Uxa, Buyan & Mullins, LLP

(57) ABSTRACT

A new video system and processor for computer is disclosed. In accordance to the present video processor that is capable of receiving TV signals and driving partial computer devices (such as a LCD panel) without starting the computer's operating system, the computer may display TV videos on the display panel of the computer without turning on the main power and the operating system. Furthermore, by returning the partial video processes to the CPU and VGA after the operating system is started, it may achieve the goals for displaying TV programs or working as a regular monitor when computer starts normally. The present video processor comprises an initial control unit, a data conversion unit, a panel drive, a memory control unit, a switch unit, a video compression unit, an I/O interface, and two selective modules.

24 Claims, 11 Drawing Sheets

VIDEO SYSTEM AND PROCESSOR FOR COMPUTER

BACKGROUND OF THE INVENTION

1. Field of the Invention

The present invention relates to a video system and processor for a computer. More particularly, the invention relates to a video system and processor capable of receiving and displaying TV signals without booting the operating system of a computer.

2. Description of the Prior Art

With the rapid development of information technology and the population of personal computers, computers gradually become one kind of household appliance as well as a refrigerator or a television, wherein most of them are used for entertainment purposes. In addition to playing games or watching movies, watching TV programs has become an important entertainment application for a computer.

By reference to a set top box (STB) or a TV image-capture card, a desktop computer may receive and display TV format videos upon its monitor. Since most monitors' power is independent from the power supply of the computer, a DT's monitor could use as TV set without starting the whole computer system. However, a notebook computer is a bit different.

FIG. 1A illustrates a conventional video system for a notebook computer. It's known that the south bridge chipset manages the data exchange between the CPU and peripherals. Video data stored in the peripherals 100 (such as a hard disk, CD-ROM) or inputted from a network, is transmitted through data bus into a south bridge chipset 102, and then exchanged between the memory 106, CPU 108, or the Video Graphic Array (VGA) 110 by the control of the north bridge chipset 104. Image data is processed in CPU 106 or VGA 110, and then generates LVDS (Low Voltage Differential Signal) format signals for driving LCD panel 112. Besides, some kinds of notebook computers exclude VGA device in their video system. In this situation, referring to FIG. 1B, the LVDS format signals are generated in the north bridge chipset 104' instead of the original VGA 110.

As well as the desktop computer, a notebook computer may use a STB for playing TV programs on the LCD panel thereof, too. STB converts the input TV signals into the computer's data format after some relevant conversions (i.e., de-interlacing and YCrCb/RGB conversion), and compresses them in advance for transmitting into south bridge chipset through an I/O interface such as the USB. VGA or CPU performs relevant signal process to drive the display panel thereafter. Unlike desktop computers, though TV signals are processed and converted into computer's format by STB, they still need the notebook's VGA (or north bridge chipset) for driving the display panel and the CPU for handling other computer devices, therefore the users still have to start the whole computer system.

As mentioned before, a notebook computer may be played as well as a TV set in accordance with the STB, but the respective signal process flow is different with a desktop computer. Besides, a notebook computer has to turn on its main power and boot the OS thereof to drive the LCD panel. Nevertheless, most time the users just like to watch TV but unwanted of using the computer itself, it's inconvenient that the users have to turn on the whole notebook anyhow.

SUMMARY OF THE INVENTION

In accordance with the aforementioned inconvenience of the current computers, especially notebooks, an objective of the invention is to provide a video system for computer having the capability of receiving and displaying TV signals without booting the computer's operating system.

Moreover, a video processor for a computer having the capability of receiving and displaying TV signals without booting the computer's operating system is disclosed. The video processor may apply to both a VGA-included or VGA-excluded computer systems, making a computer being able to show TV videos without booting the computer's operating system.

Accordingly, the video processor for foregoing video systems which could receive and display TV signals without booting the computer's OS comprises: an initial control unit, a data conversion unit, a panel drive, a memory control unit, a switch unit, a video compression unit, a I/O interface, and two selective modules. Among them, the initial control unit initializes and drives the partial computer devices—such as the audio card—when OS is not started. Data conversion unit is used to convert the TV format data into computer format data. The panel drive generates LVDS format data for driving the computer's LCD panel. Memory control unit allocates the required memories for accessing data and data processing. The switch unit is used to switch the current operating mode for displaying TV or computer's videos. The video compression unit is used to compress video data, thereby transferring the video data to other computer devices via the I/O interface. In additions, the video processor may further comprise a ROM for recording a plurality of parameters for different TV systems.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DETAILED DESCRIPTION OF THE INVENTION

Some preferred embodiments of the present invention will be described in detail in the following. However, beside the detailed description, the present invention can also be applied widely in other embodiments and the scope of the present invention is only limited by the appended claims.

For more a particular focus on the main objectives of the invention, some devices are not described in detail throughout the patent instructions and relative drawings beneath, such as the I/O interface for TV signal, I/O port for LVDS signals . . . etc. Furthermore, although TV signals contain both video and audio parts, the present invention particularly relates to video processing and the audio part is just slightly mentioned in the patent instruction.

Figure 1A:
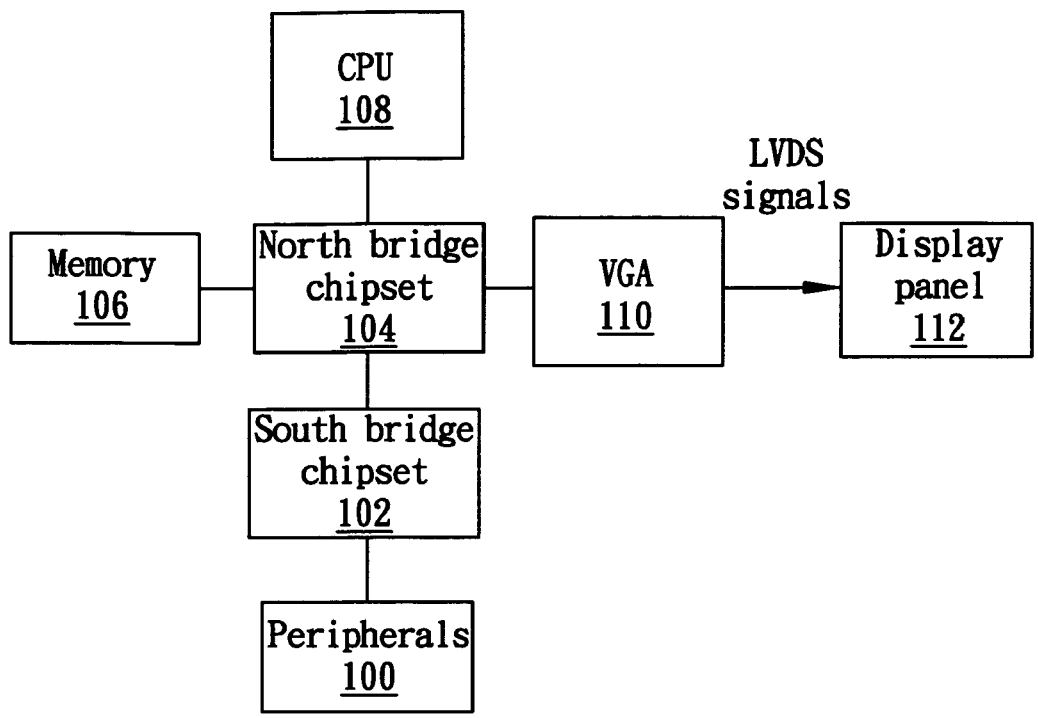
FIG. 1A illustrates the conventional video system of a VGA-included notebook computer.
Figure 1B:
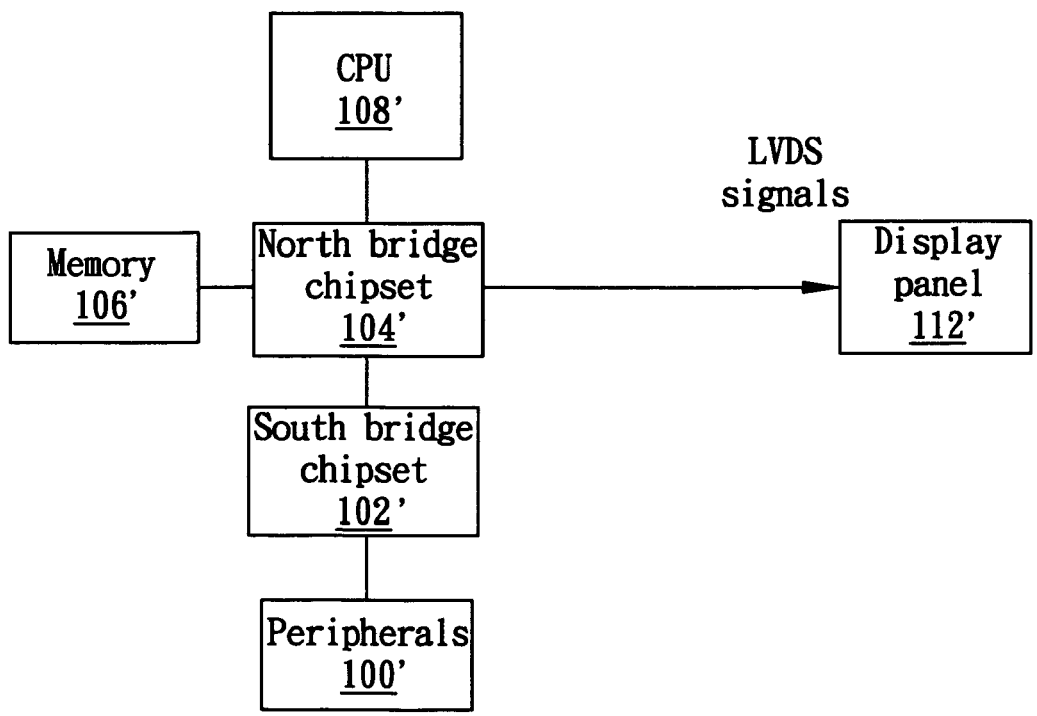
FIG. 1B illustrates the conventional video system of a VGA-excluded notebook computer.
Figure 2A:
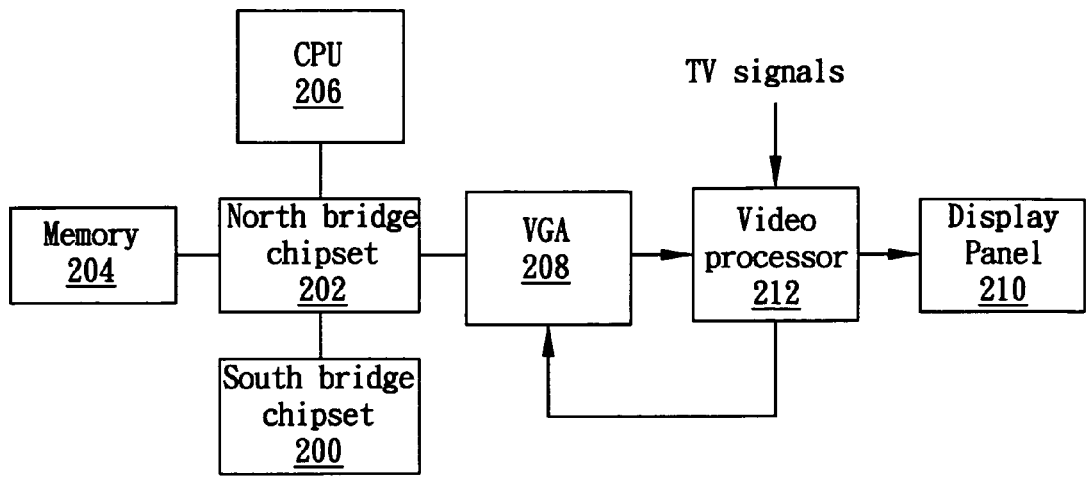
FIG. 2A illustrates the present video system with a VGA-included notebook computer.
Figure 2B:
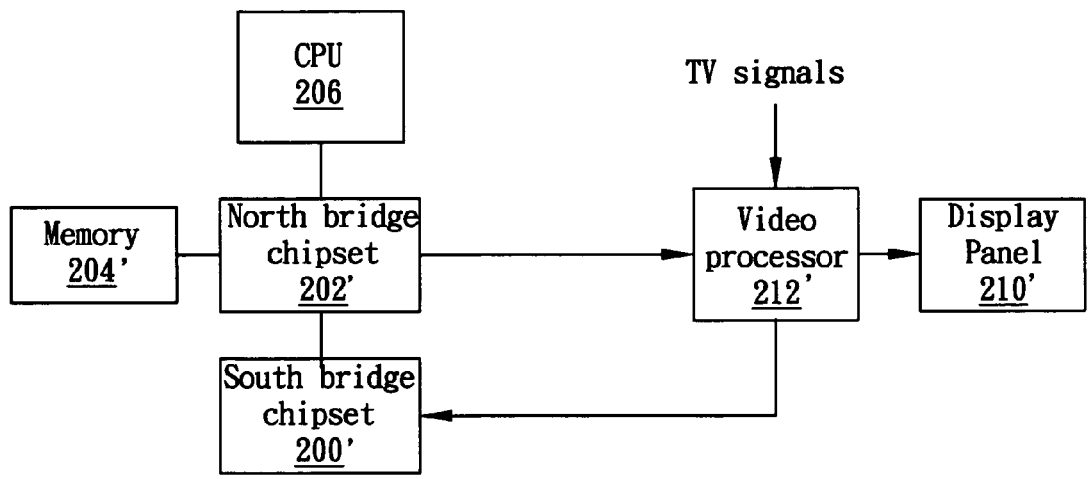
FIG. 2B illustrates the present video system with a VGA-excluded notebook computer.

FIG. 2A illustrates the video system for a VGA-included notebook computer, in which a video processor is increased and disposed between display panel and VGA device. The present video system comprises: a south bridge chipset 200, a north bridge chipset 202, a memory 204, a CPU 206, a VGA 208, a display panel 210, and a video processor 212. South bridge chipset, north bridge chipset, memory, CPU, and VGA form the core module of a notebook computer, which processes most programs and data—which certainly includes the video data. Through a data interface (not shown in the drawing), such as CCIR601 or CCIR 606 standard compatible I/O interfaces, TV signals are inputted into the video processor 212. The arrow in the drawing represents the transferring direction of TV video signals. As well as FIG. 2A, FIG. 2B which illustrates a video system for a VGA-excluded notebook computer, in which the LVDS signals are generated via a north bridge chipset 202' instead of a VGA device. Other devices are identical to those in FIG. 2A.

Not only increases the video processor 212, the power system of the aforementioned computer video system has to make some adjustments, thereby providing essential power source to some peripherals, such as the display panel or the sound card, without turning on the notebook computer. A practicable way suchlike increasing a switch button particularly used for playing TV programs without booting the operating system is straightforward.

Saying video processor 212, 212' plays important roles in the present invention. The present video processor of the invention makes both types of notebook computers (VGA-included and VGA-excluded) have capabilities to receive TV signals, play TV programs without booting the operating system, besides, the present video system may switch to play TV programs or be used as normal notebook computer when the operating system operates normally. Details of the video processor will be discussed below.

Figure 3:
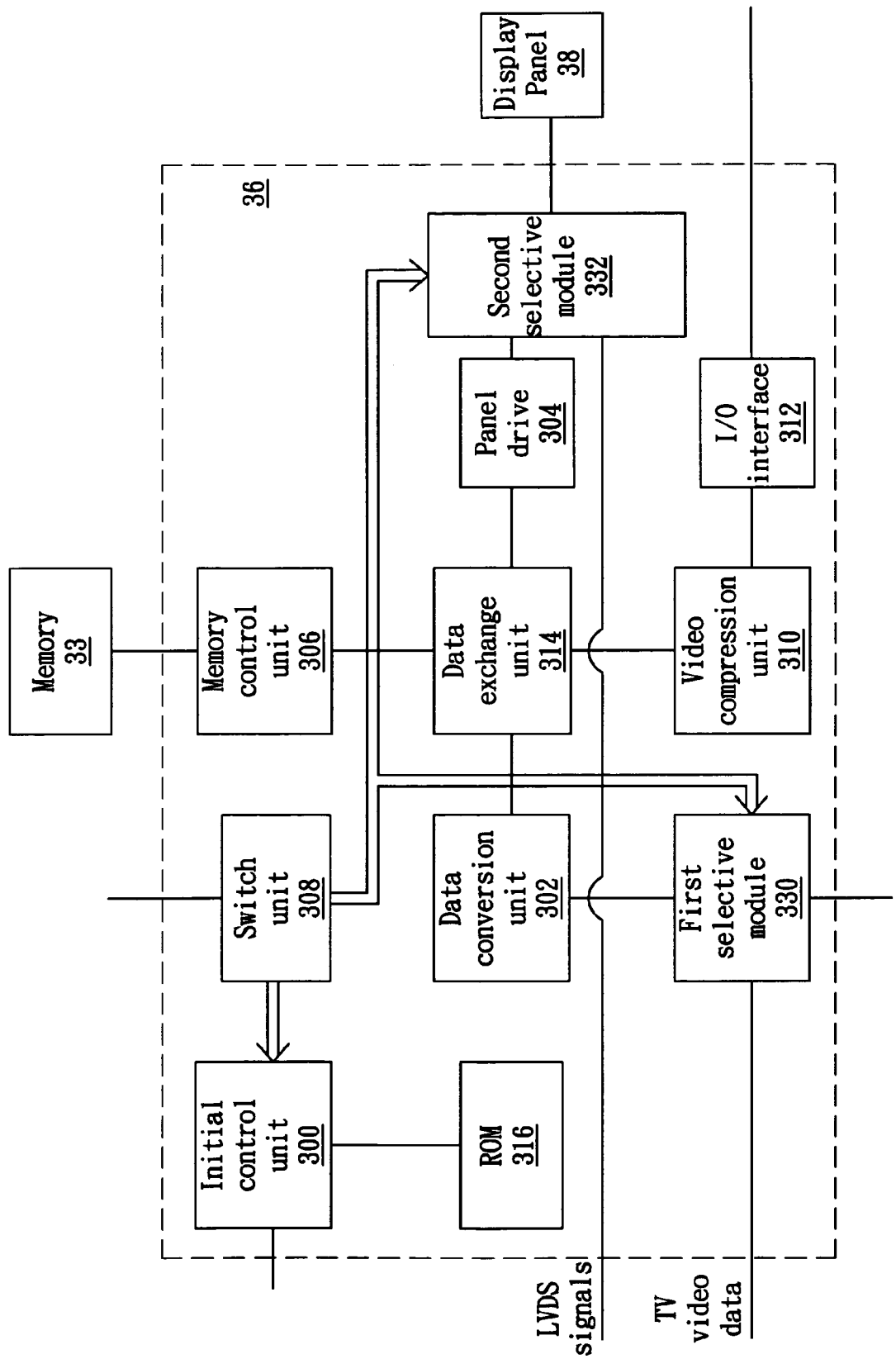
FIG. 3 illustrates a video processor for a preferred embodiment of the invention.

FIG. 3 illustrates the present video processor of the invention. As shown in the drawing, the video processor 36 comprises: an initial control unit 300, a data conversion unit 302, a panel drive 304, a memory control unit 306, a switch unit 308, an video compression unit 310, an I/O interface 312, a data exchange interface 314, a first selective module 330, and a second selective module 332. Moreover, the present video processor 36 further connects with display panel 38 and memory module 33. Functions for foregoing components will be described later. Furthermore, the video processor 36 may further comprise a ROM 316 for storing parameters of different TV specifications (NTSC or PAL), thereby being compatible to different TV systems and countries.

The present video system and processor for computer has three types of operating mode, which include: "power-off" mode, computer mode, and TV mode. A power-off mode means a computer is used for playing TV programs but without booting the operating system thereof. In this case, basically the main system of a notebook computer is shut down, and the video processor handles all relevant computer devices of playing TV programs instead. A computer mode means the computer works in its normal operation, in other word, "just a computer". In this case, the video processor 212 (212') just bypasses the LVDS signals from VGA 208 (north bridge chipset 202') to the display panel 210 (210'), in other words, the video processor is just a transmission line between the display panel 210 and the VGA 208. The TV mode means the notebook computer starts and works normally, but is used to play TV programs right now. The following paragraph illustrates the connection relations and the signal flows of three operating modes for a VGA-included and VGA-excluded video system.

Figure 4A:
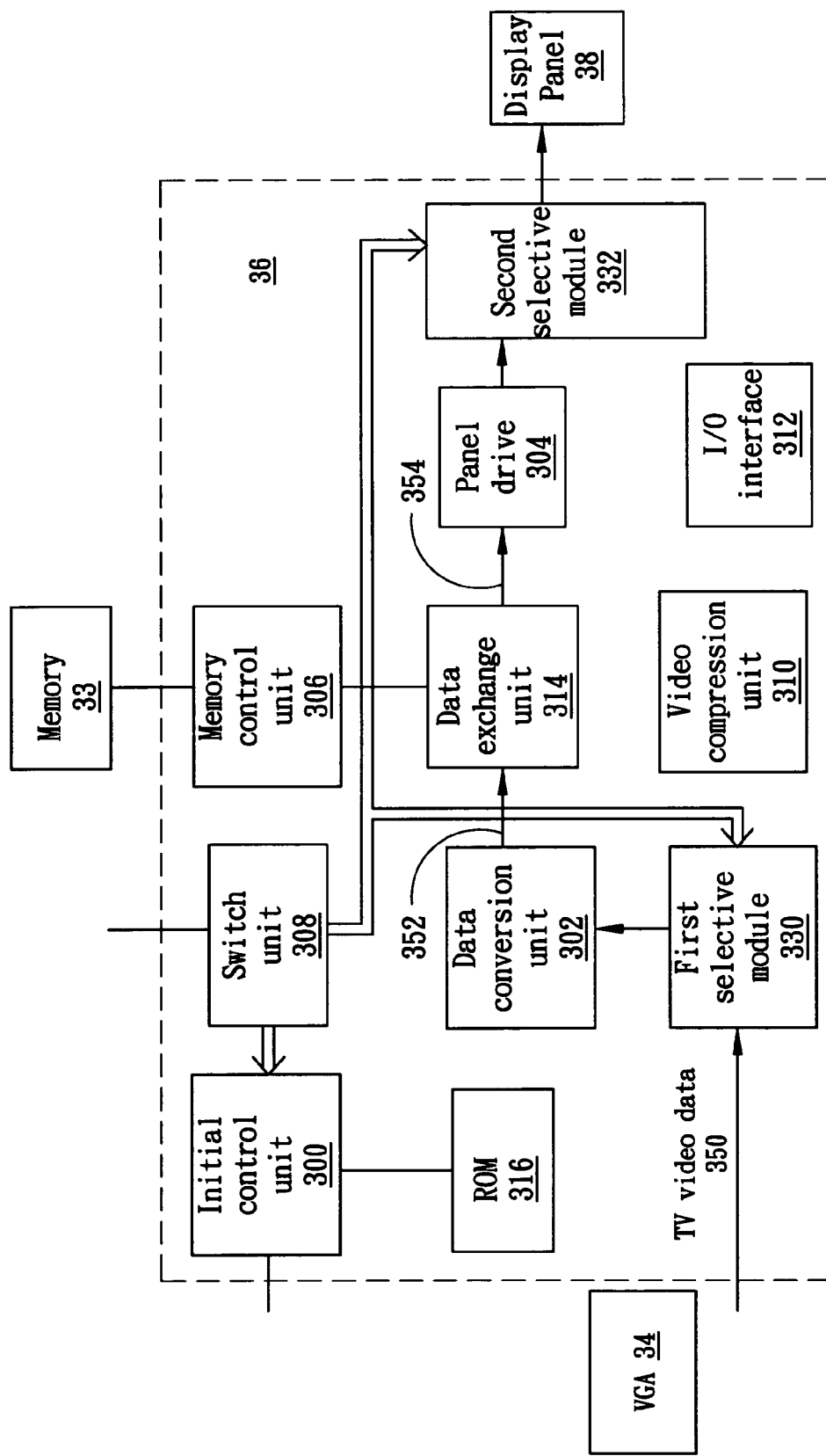
FIG. 4A illustrates the signal flow of the present video system and processor in power-off mode when applying to VGA-included computer system.
Figure 4B:
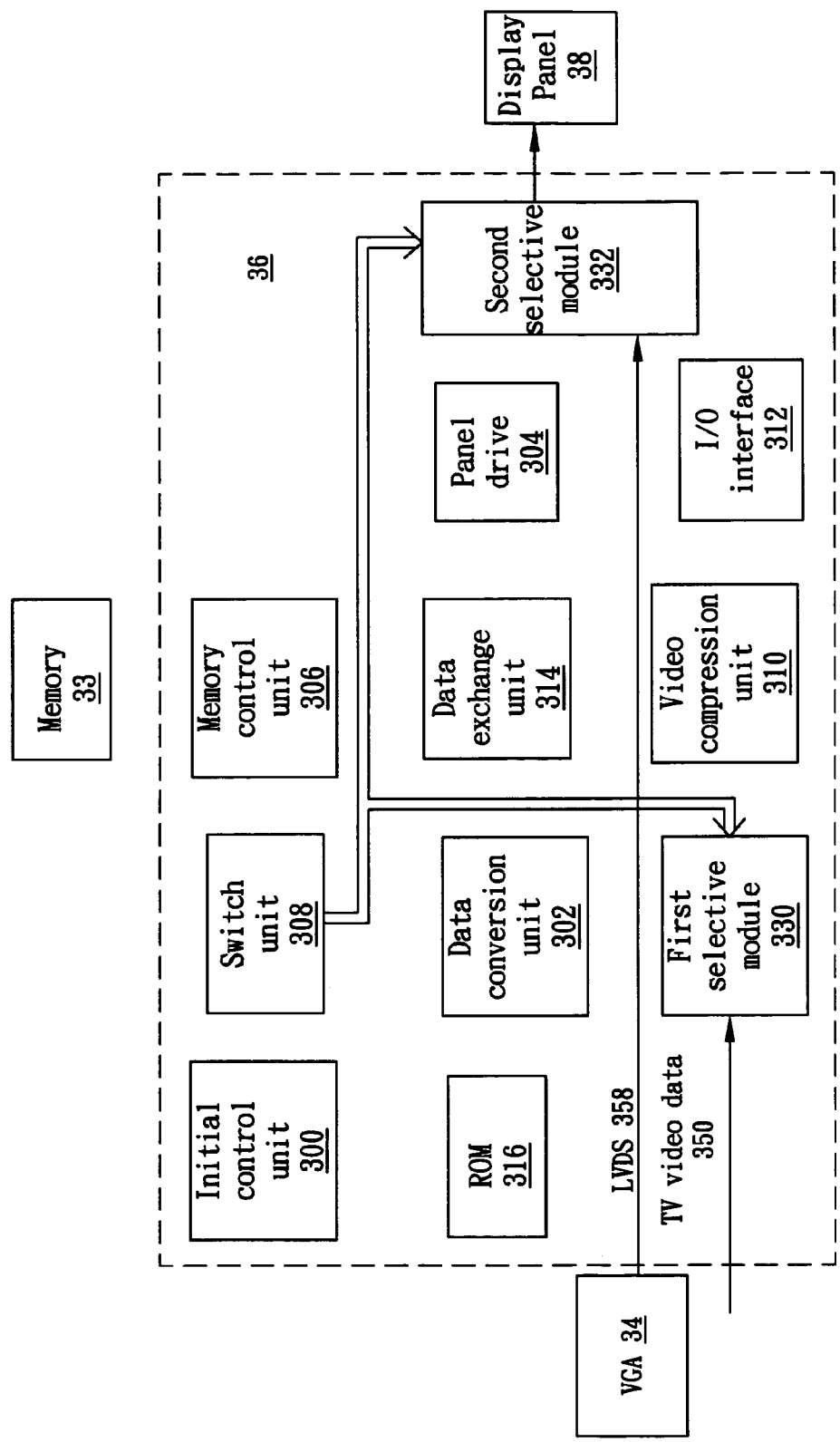
FIG. 4B illustrates the signal flow of the present video system and processor in computer mode when applying to VGA-included computer system.
Figure 4C:
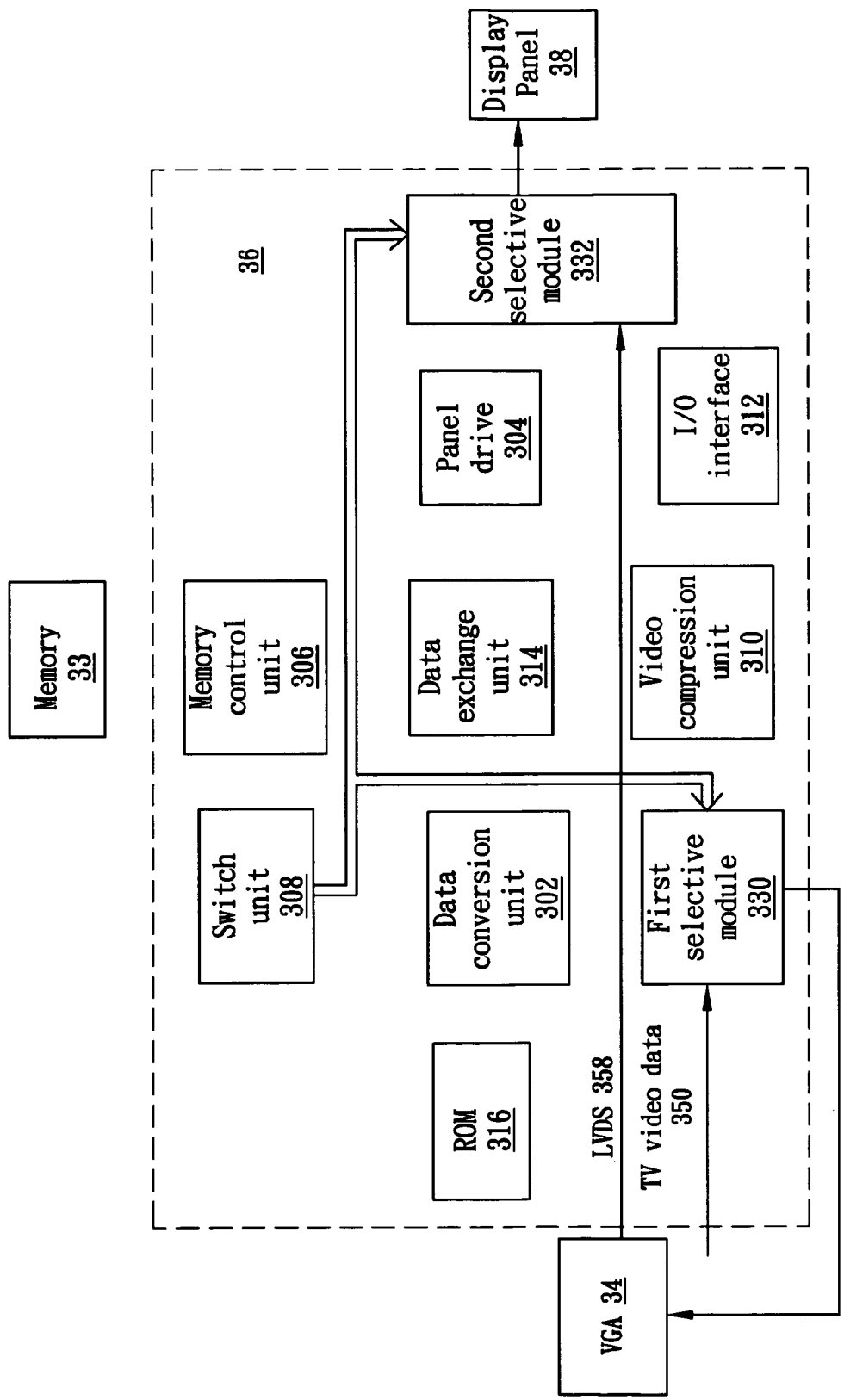
FIG. 4C illustrates the signal flow of the present video system and processor in TV mode when applying to VGA-included computer system.

FIG. 4A to FIG. 4C illustrates the signal flows of the present video system and processor for VGA-included computer system as in the power-off mode, computer mode, and TV mode respectively. In the power-off mode, neither the south bridge chipset, north bridge chipset, memory module, CPU, and VGA are all shut down (not shown in drawing), but also the computer's OS doesn't start. Since all devices of a notebook computer can not operate, if a user intends to play TV programs on the LCD panel now, a device for handling relevant computer devices instead of a CPU—the present video processor, is needed. When the notebook computer receives a control signal (i.e., the control signal may be generated by an another switch button, which does not start the OS as well as normally turning on the notebook computer), the video processor and system will depart from the status of totally shut down and enter the power-off mode. In the next procedure, firstly the power system provides power source to the present video processor 36, wherein an initial control unit 300 output driving signals to initialize and handle other peripherals such as the sound card, memory, or keyboard . . . etc., as well as the computer's BIOS.

In the power-off mode, through an I/O interface (not shown in the drawing) TV video signals 350 input to the first selective module 330 and then selectively output to data conversion unit 302. It's understood that, unlike the progressive scan and RGB image format of the computer, the TV video signals are interlaced, which displays images via the output of odd scanlines and even scanlines in turn to form a complete picture. In addition, the TV video signals adopts YCrCb (YUV) data formats, hence it's necessary for converting TV video format into computer's format before driving the display panel 38. The main objective of the data conversion unit 302 is to perform de-interlacing and YCrCb/RGB conversion, thereby acquiring video data in computer video format.

However, the aforementioned TV/computer format signal conversion induces lots of data. Human's eyes feel the flickers when the frame rate of a consecutive image pictures is less than 30 Hz, but the situation will be eliminated when the frame rate arises to 60 Hz or higher. Accordingly, the current image frame rate is higher than 60 Hz in a computer monitor.

As to TV's pictures, its frame rate is about 24-30 Hz that just be half of computer's image. Besides, TV's image resolution is usually less than the computer's; hence the data size will be increased as TV signals are converted into Computer video data. The huge amount of data can not be directly inputted into the panel drive, but stored temporally in a memory.

The converted computer video data temporally stored in memory 33 before being inputted into the panel drive 304. In this preferable example, data exchange interface 314 handles the data exchanges between the data conversion unit 302, panel drive 304, and memory control unit 306. Since the VGA device is off as in power-off mode, the panel drive 304 generates LVDS signals for driving the display panel 38. In the next procedure, the second selective module 332 receives signals from the panel drive 304 and output to display panel 38.

In computer mode, referring to FIG. 4B, the whole system is used as a normal computer, which is unnecessary during display TV signals. In this case the video processor 36 works simply as a bypass circuit. The computer's video data is computed in VGA 34 to generate LVDS signals 358, and the LVDS signals 358 input into the second selective module 332 in next. Unlike in the power-off mode, the second selective module 332 receives the output of the VGA 36 instead of a panel drive 304 in the computer mode. Hence, it needs only the second selective module 332 to pass the LVDS signals 358 to the display panel 38 as in the computer mode.

It's understood that, all devices are controlled by the computer's operating system as in the TV mode. Referring to FIG. 4C, VGA 34 works normally under the control of computer's OS and generates LVDS signals to drive the display panel 38. In this case, the first selective module 330 receives the TV video signals 350 and selectively outputs to a VGA 34 instead of the data conversion unit 302 as in the power-off mode (the corresponding computations and conversions suchlike de-interlacing and YCrCb/RGB conversion are done in the VGA), and further generate LVDS signals 358 by VGA 34. In next, the LVDS signals 358 input the present video processor 36 once again and relay to the second selective module 332. The second selective module 332 chooses the LVDS signals 358 as effective input signals, and transfers the LVDS signals 358 to the display panel 38 directly. In other words, the video processor 36 replays TV video data 350 to VGA 34 for TV/computer video conversion, and then bypasses the generated LVDS signals 358 to display panel 38. As well as computer mode, it needs only the second selective module 332 to pass the LVDS signals 358 to the display panel 38 as in TV mode.

Summarily speaking, the TV video data 350 inputs the data conversion unit 302 through the first selective module 330 in the power-off mode, but outputs to the VGA 34 as in TV mode. The second selective module 332 accepts the output signals from panel drive 304 in power-off mode, but accepts the output LVDS signals 358 from VGA 34 in computer and TV mode. Therefore, an unit for selecting the effective output port of first selective module 330 and the effective input port of the second selective module 332, which switches three operating modes of the present video processor, is needed. The main objective of the switch unit 308 is to handle the first selective module 330 and second selective module 332 selecting its effective input/output port as in different operating modes, and disables the first selective module 330 as in the computer mode. Moreover, the switch unit 308 also triggers the initial control unit 300 driving some computer devices as in the power-off mode. A keyboard or a switch button on display panel may generate saying mode switch order, which is unlimited in the invention.

Figure 5:
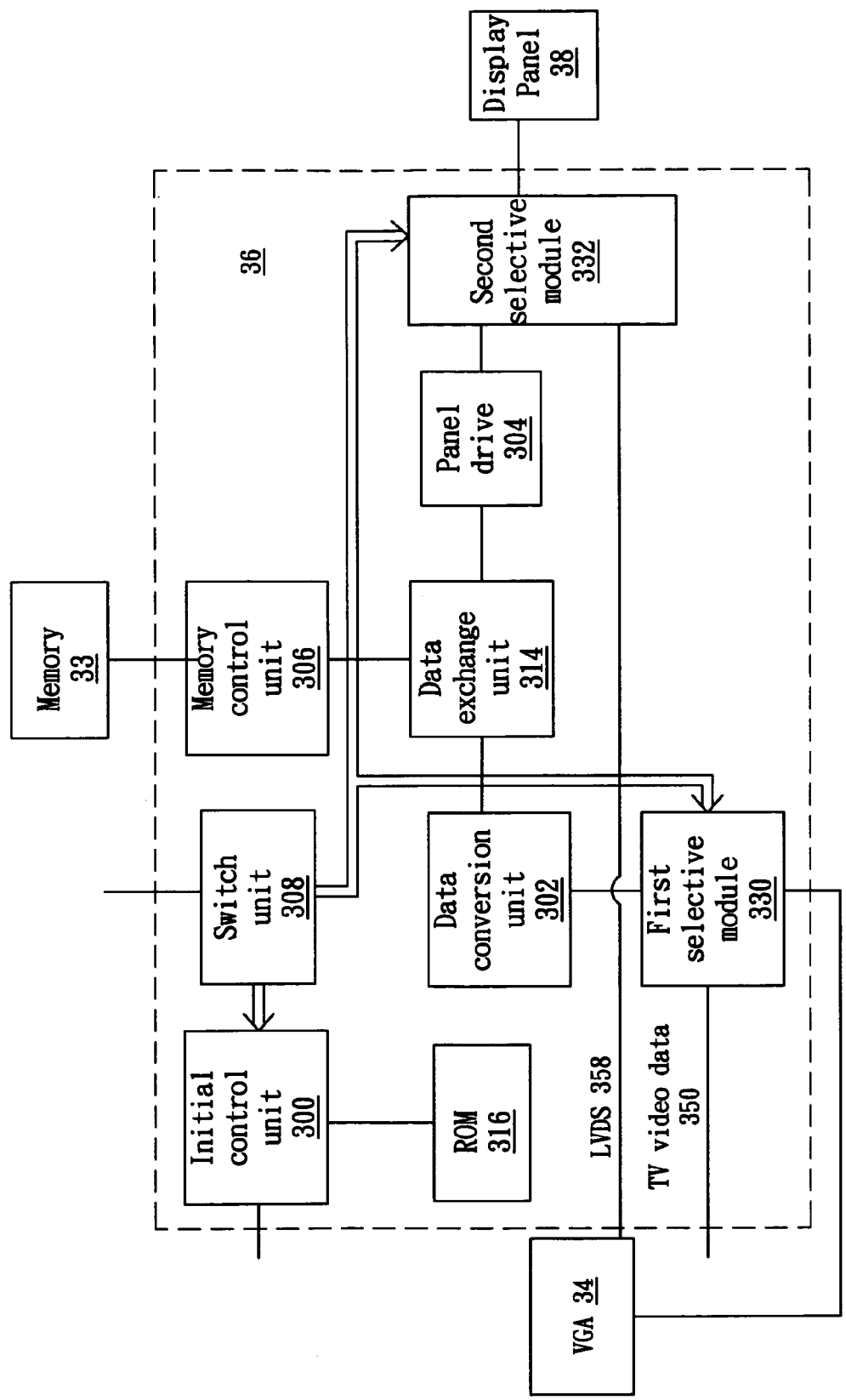
FIG. 5 illustrates a video processor for an another embodiment of the invention.

As shown in FIG. 4A to FIG. 4C, the video compression unit 310 and I/O interface 312 are redundant to a VGA-included computer system. Hence, referring to FIG. 5, the video processor 36 may omit the video compression unit 310 and the I/O interface 312, besides, to make the first selective module electrically couple with VGA 54 directly when applying to a VGA-included computer system.

Figure 6A:
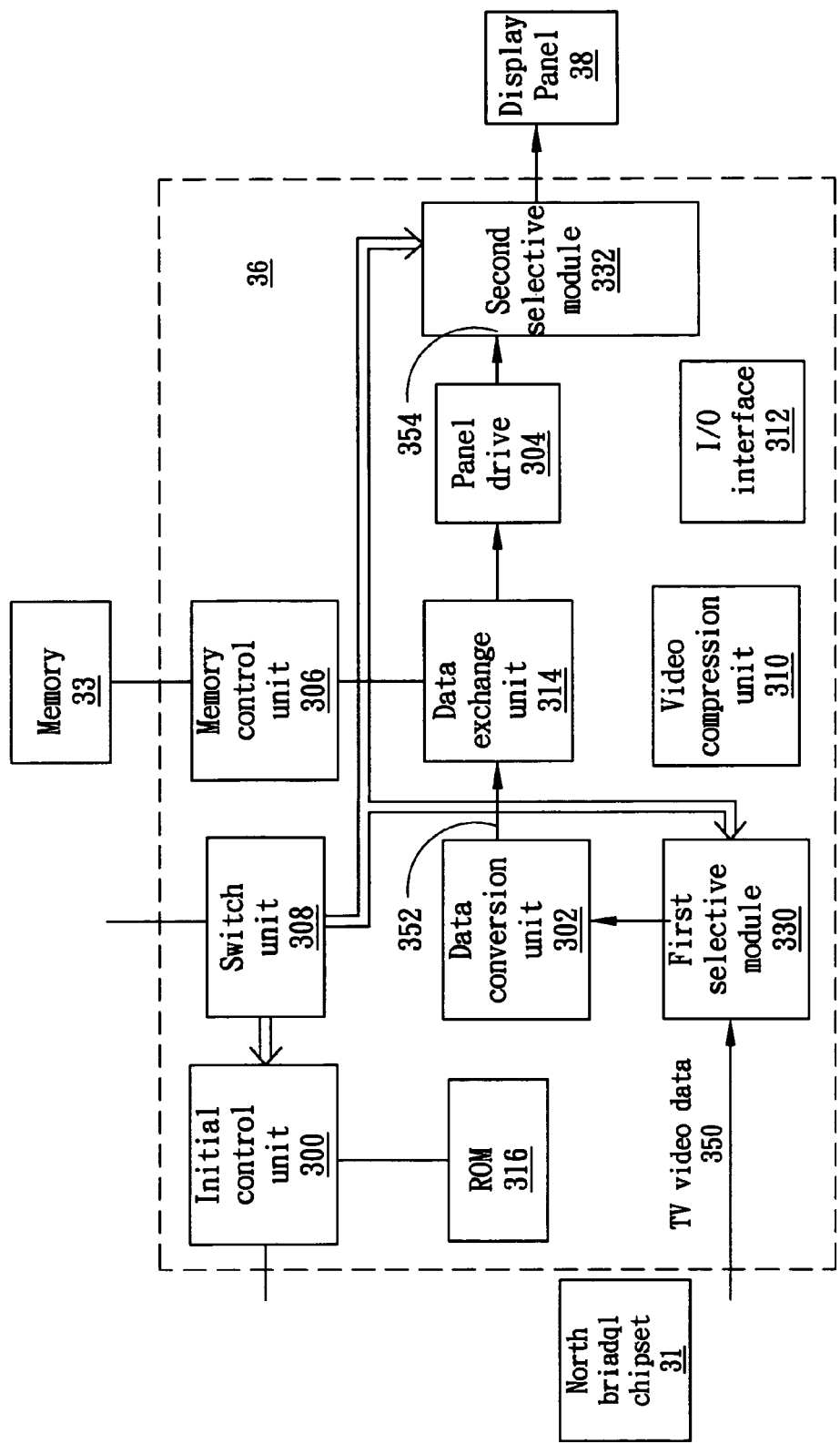
FIG. 6A illustrates the signal flow of the present video system and processor in power-off mode when applying to VGA-excluded computer system.
Figure 6B:
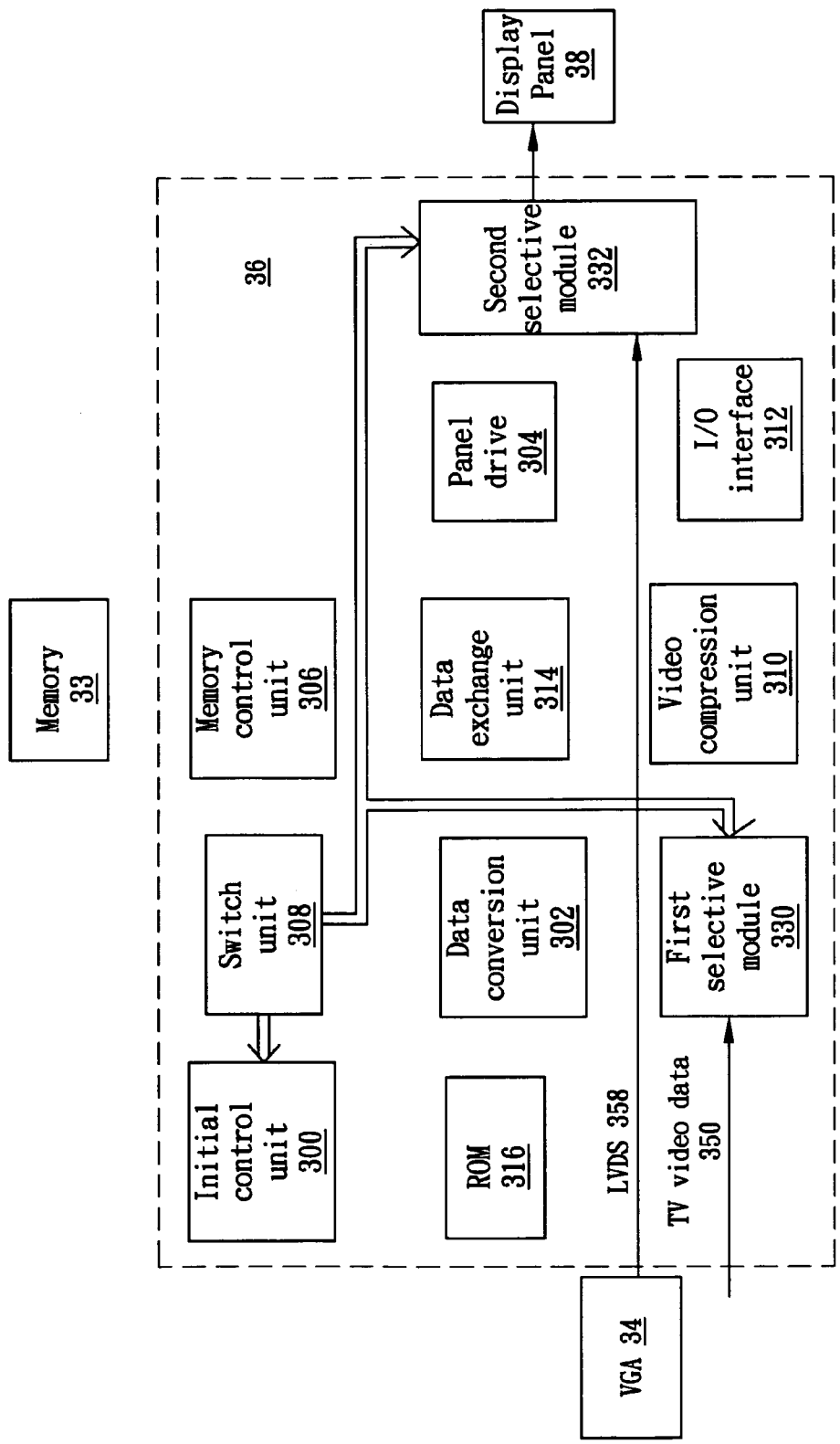
FIG. 6B illustrates the signal flow of the present video system and processor in computer mode when applying to VGA-excluded computer system.
Figure 6C:
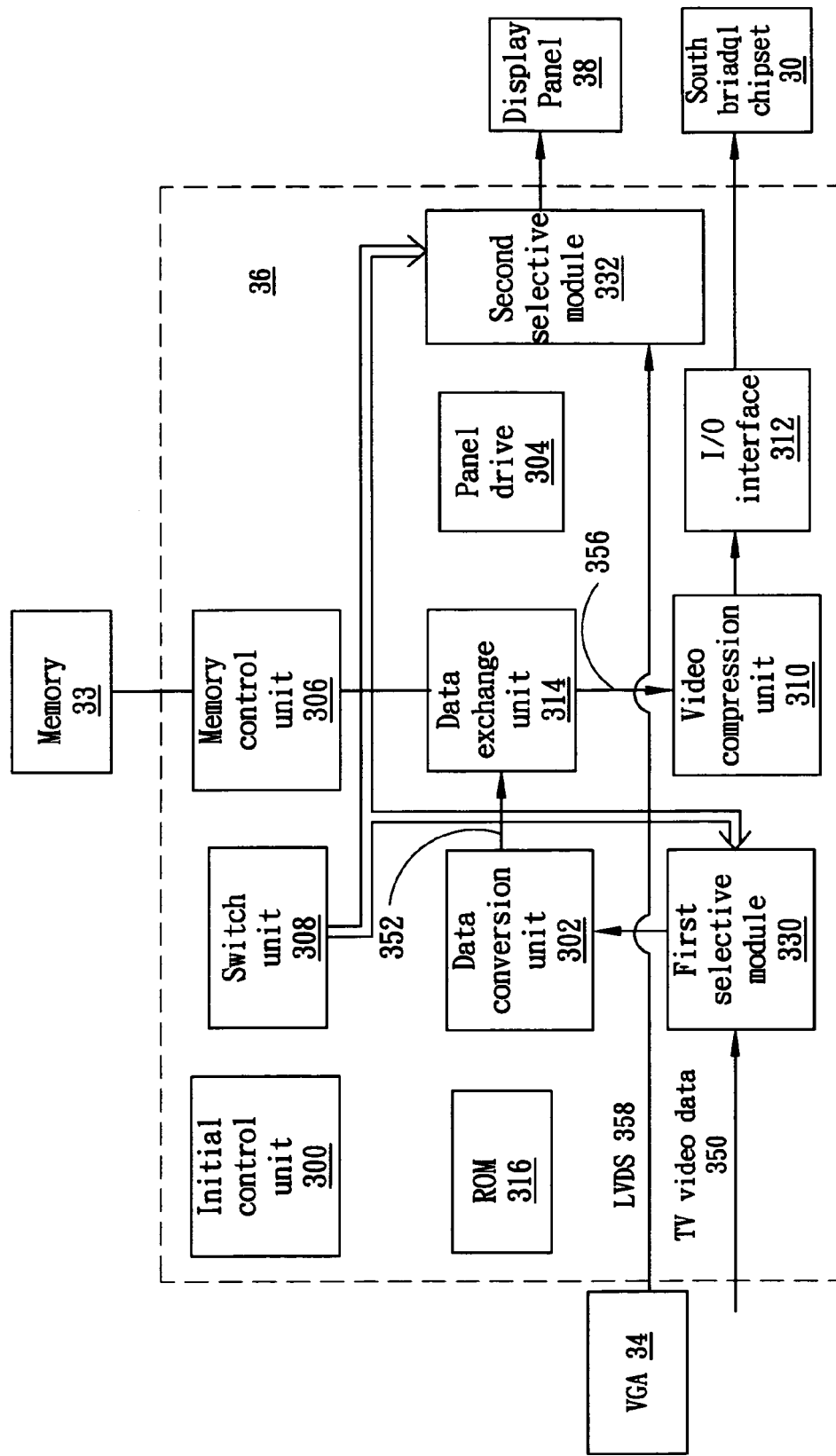
FIG. 6C illustrates the signal flow of the present video system and processor in TV mode when applying to VGA-excluded computer system.

FIG. 6A to FIG. 6C illustrates the signal flows of the present video system and processor for the VGA-excluded computer system (FIG. 2B) as in power-off mode, computer mode, and TV mode respectively. In the power-off mode, referring to FIG. 6A, the initial control unit 300 starts and handles relevant computer devices. The first selective module 330 receives input TV video data 350 and selectively outputs saying TV video data 350 to the data conversion unit 302. The data conversion unit 302 performs TV/computer conversion processes such as the de-interlacing, YCrCb/RGB conversion on saying TV video data 350 to generate the computer video data 352, which will transmit to memory 33 through data exchange interface 314 and handles by the memory control unit 306. Also, the memory control unit 306 accesses the stored computer video data and transmits it to the panel drive 304 through data exchange interface 314 for generating the LVDS signals 354. Finally, the second selective module 332 receives the LVDS signal 354 and outputs them to display panel 38, thereby playing TV programs on the display panel 38.

Similarly, the present video processor works simply as a bypass circuit in computer mode, just like the video processor applying to a VGA-included computer system. In this case, referring to FIG. 6B, the north bridge chipset 31 generates the LVDS signals 358 for driving the display panel 38, which will input the second selective module 332 directly. This time the second selective module 332 selects the LVDS signals 358 as its effective input signals to output to the display panel 38.

In the TV mode, since the computer system comprises no VGA device, TV/computer video conversion has to be finished in the data conversion unit 302 instead of the VGA device as well as applied the video processor to the VGA-included computer system. Referring to FIG. 6C, the TV video data 350 inputs the first selective module 330 and selectively outputs to the data conversion unit 350 for TV/computer video conversion. The memory control unit 306 handles the data access of the generated computer video data 352 that transmits through the data exchange unit 314 to store in the memory 33. Since the display panel 38 is driven by north bridge chipset 31 in TV mode, the converted computer video data 352 has to return the north bridge chipset 31 for generating the LVDS signals 358. As mentioned before, TV/computer video conversion induces lot's of data, hence the computer video data 352 has to be compressed to reduce its size, thereby inputting the north bridge chipset 31 through I/O interface 312, south bridge chipset 30 in sequence. Accordingly, the computer video data 352 inputs the video compression unit 310 for data compression, especially the discrete cosine transform (DCT), and obtains a compressed video data 356. In the next procedure, the compressed video data 356 outputs to the south bridge chipset 30 through the I/O interface 312. In a preferable example, the I/O interface 312 is an universal serial bus (USB).

The south bridge chipset 30 receives the compressed video data 356, outputs it to CPU, and then transmits to the north bridge chipset 31 for generating the LVDS signals 358. Next, the LVDS signals 358 re-input the video processor 36 to the second selective module 332. This time the second selective module 332 receives the LVDS signals 358 as its effective input signals, and outputs the LVDS signals 358 to the display panel 38 for displaying TV video.

As well as the VGA-included computer system, the switch unit 308 handles and switches the effective output port of the first selective module 330 and the effective input port of the second selective module 332 between three operating modes. Moreover, the switch unit 308 also triggers the initial control unit 300 as mentioned above, which will not be explained again here.

Figure 7:
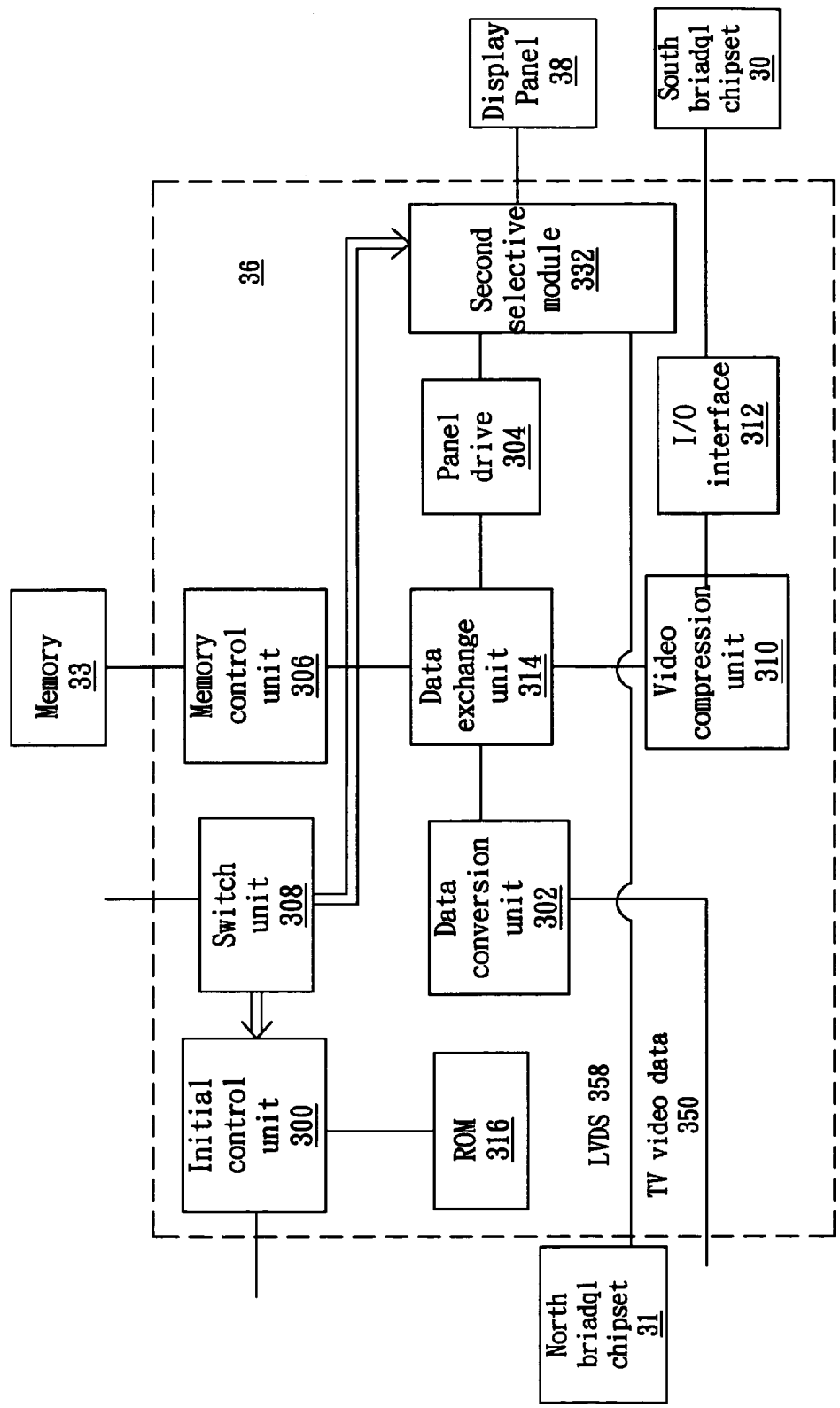
FIG. 7 illustrates a video processor for an another embodiment of the invention.

Summarily speaking, when the present video processor applies to a VGA-excluded computer system, the first selective module 330 always outputs the TV video data to the data conversion unit 302. Therefore, the present video processor 36 may further omit the first selective module 330 but directly coupling with the data conversion unit 302. Referring to FIG. 7, the simplified video processor contains only one selective module 732 (identical to aforementioned second selective module 332), and the I/O interface 312 is directly connected with the south bridge chipset 30.

It's noticed that, though it takes notebook computer for example in the patent instruction, the invention doesn't limit to apply to notebook computer but also broadly used in desktop computers.

Although specific embodiments have been illustrated and described, it will be obvious to those skilled in the art that various modifications may be made without departing from what is intended to be limited solely by the appended claims.

What is claimed is:

1. A video processor capable of playing TV programs on a display panel of a computer without booting the computer's operating system, said video processor comprises:
    an initial control unit for handling relevant computer devices;
    a data conversion unit for converting input TV video data into computer video data;
    a panel drive for generating a driving signal in LVDS format;
    a memory control unit for controlling an external memory to access data;
    a video compression unit for compressing said computer video data into compressed video data;
    a data exchange interface, wherein said data conversion unit, said memory control unit, and said video compression unit exchanges data through said data exchange interface;
    a first selective module including an input port, a first output port, and a second output port, wherein said first selective module receives said TV video data from said input port and selects said first output port or said second output port for outputting said TV video data;
    a second selective module comprising:
        a first input port electrically coupling with said panel drive;
        a second input port electrically coupling with an external video processor;
        an output port electrically coupling with a display panel, wherein said second selective module selects said first input port or said second input port to output to said display panel; and
    a switch unit for receiving a mode switch order to select an effective input port of said second selective module and an effective output port of said first selective module.

2. The video processor according to claim 1, wherein said first output port of said first selective module electrically couples with said data conversion unit, and said second output port electrically couples with a VGA when applying to a VGA-included computer system, otherwise said second output port electrically opens when applying to a VGA-excluded computer system.

3. The video processor according to claim 2, wherein said switch unit selects said first output port of said first selective module as effective output and selects said first input port of said second selective module as effective input as in power-off mode.

4. The video processor according to claim 2, wherein said switch unit selects said second input port of said second selective module as effective input and disables said first selective module as in computer mode.

5. The video processor according to claim 2, wherein said switch unit selects said second output port of said first selective module as effective output and said second input port of said second selective module as effective input when applying to a VGA-included computer system in TV mode.

6. The video processor according to claim 2, wherein switch unit selects said first output port of said first selective module as effective output and selects said second input port of said second selective module as effective input when applying to a VGA-excluded computer system in TV mode.

7. The video processor according to claim 1, wherein said external video processor is the VGA when applying to a VGA-included computer system, or said external video processor is a north bridge chipset when applying to a VGA-included computer system.

8. The video processor according to claim 1, wherein said video compression unit generates said compressed video data and outputs said compressed video data to a south bridge chipset through an I/O interface when applying to a VGA-excluded computer system.

9. A video processor, which applies to a VGA-included computer system for playing TV programs on a display panel without booting the computer's operating system, said video processor comprises:
    an initial control unit for handling relevant computer devices;
    a data conversion unit for converting input TV video data into computer video data;
    a panel drive for generating a driving signal in LVDS format;
    a memory control unit for controlling an external memory to access data;
    a data exchange interface, wherein said data conversion unit, said memory control unit, and said panel drive exchanges data through said data exchange interface;
    a first selective module including:
        an input port for receiving the input TV video data;
        a first output port electrically coupling with said data conversion unit;
        a second output port electrically coupling with the VGA, wherein said first selective module outputs said TV video data selectively through said first output port or said second output port;
    a second selective module including:
        a first input port electrically coupling with said panel drive;
        a second input port electrically coupling with the VGA;
        an output port electrically coupling with a display panel, wherein said second selective module selects said first input port or said second input port to output to said display panel; and
    a switch unit for receiving a mode switch order to select an effective input port of said second selective module and an effective output port of said first selective module.

10. The video processor according to claim 9, wherein said switch unit selects said first output port of said first selective module as effective output and selects said first input port of said second selective module as effective input as in power-off mode.

11. The video processor according to claim 9, wherein said switch unit selects said second input port of said second selective module as effective input as in computer mode.

12. The video processor according to claim 9, wherein said switch unit selects said second output port of said first selective module as effective output and selects said second input port of said second selective module as effective input as in TV mode.

13. A video processor, which applies to a VGA-excluded computer system for playing TV programs on a display panel without booting the computer's operating system, said video processor comprises:
   an initial control unit for handling relevant computer devices;
   a data conversion unit for converting input TV video data into computer video data;
   a panel drive for generating a driving signal in LVDS format;
   a memory control unit for controlling an external memory to access data;
   a video compression unit for compressing said computer video data into compressed video data;
   a data exchange interface, wherein said data conversion unit, said memory control unit, said video compression unit, and said panel drive exchanges data through said data exchange interface;
   a selective module including a first input port electrically coupling with said panel drive, a second input port electrically coupling with a north bridge chipset, and an output port electrically coupling with a display panel, wherein said selective module selects an effective input port to output to the display panel; and
   a switch unit for receiving a mode switch order to select an effective input port of said selective module.

14. The video processor according to claim 13, wherein said switch unit selects said first input port of said selective module as effective input as in power-off mode.

15. The video processor according to claim 13, wherein said switch unit selects said first input port of said selective module as effective module as in computer mode and TV mode.

16. The video processor according to claim 13, wherein said video compression unit generates said compressed video data and outputs said compressed video data to a south bridge chipset through an I/O interface.

17. A computer video system capable of playing TV programs on a display panel without booting the computer's operating system, said computer video system comprises:
   a core module including a CPU, a memory, a south bridge chipset, and a north bridge chipset for computing data;
   a display panel for displaying videos; and
   a video processor, wherein said video processor receives TV video data and processes a TV/computer signal conversion to generate a first panel driving signal, or receives a second panel driving signal of LVDS format generated by the core module to output to the display panel, and includes:
   an initial control unit for handling relevant computer devices;
   a data controller used for controlling data within said video processor;
   a data exchange interface, wherein said data controller exchanges data through said data exchange interface;
   a selective module for selecting an effective input port to output to the display panel; and
   a switch unit for receiving a mode switch order to select an effective input port of said selective module.

18. The computer video system according to claim 17, wherein said core module further comprises a VGA device.

19. The computer video system according to claim 17, wherein said video processor has said initial control unit for handling relevant computer devices as in power-off mode.

20. The computer video system according to claim 17, wherein said video processor receives said TV video data and generates said first panel driving signal to said display panel after the TV/computer signal conversion as in power-off mode.

21. The computer video system according to claim 17, wherein said video processor receives said second panel driving signal and bypasses said second panel driving signal to said display panel as in computer mode.

22. The computer video system according to claim 17, wherein said video processor returns said TV video data or said computer video data to said core module for generating said second panel driving signal and then bypasses said second driving signal to said display panel as in TV mode.

23. The computer video system according to claim 17, wherein said data controller includes:
   a data conversion unit for converting input TV video data into computer video data;
   a panel drive for generating a driving signal in LVDS format;
   a memory control unit for controlling an external memory to access data; and
   a video compression unit for compressing said computer video data into compressed video data.

24. The computer video system according to claim 17, wherein said data exchange interface includes:
   a first port electrically coupling with a panel drive;
   a second port electrically coupling with said north bridge chipset; and
   an output port electrically coupling with said display panel.

* * * * *